(12) United States Patent
Egawa et al.

(10) Patent No.: US 8,360,584 B2
(45) Date of Patent: Jan. 29, 2013

(54) PROJECTOR

(75) Inventors: Akira Egawa, Shiojiri (JP); Kaname Nagatani, Matsumoto (JP); Kunihiko Takagi, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 292 days.

(21) Appl. No.: 12/832,318

(22) Filed: Jul. 8, 2010

(65) Prior Publication Data

US 2011/0019159 A1    Jan. 27, 2011

(30) Foreign Application Priority Data

Jul. 22, 2009    (JP) .................................. 2009-170889

(51) Int. Cl.
*G03B 21/16* (2006.01)

(52) U.S. Cl. ........................................... 353/57; 353/61

(58) Field of Classification Search .................... 353/57, 353/58, 60, 61, 119
See application file for complete search history.

(56) References Cited

U.S. PATENT DOCUMENTS

| | | | |
|---|---|---|---|
| 6,736,513 B2* | 5/2004 | Koyama et al. .................. | 353/31 |
| 6,746,125 B2* | 6/2004 | Nakano et al. .................. | 353/61 |
| 6,986,582 B2 | 1/2006 | Kobayashi | |
| 7,393,109 B2* | 7/2008 | Arboix ............................. | 353/57 |
| 2006/0268239 A1* | 11/2006 | Nasu et al. ...................... | 353/57 |
| 2007/0195280 A1* | 8/2007 | Chen et al. ...................... | 353/58 |
| 2007/0273839 A1* | 11/2007 | Doi et al. ......................... | 353/57 |
| 2008/0252859 A1* | 10/2008 | Nagahata et al. ............... | 353/61 |
| 2008/0316437 A1* | 12/2008 | Kase ................................ | 353/61 |

FOREIGN PATENT DOCUMENTS

| | | |
|---|---|---|
| JP | 2001-281613 A | 10/2001 |
| JP | 2004-246108 A | 9/2004 |
| JP | 2005-266833 A | 9/2005 |
| JP | 2007-041414 A | 2/2007 |
| JP | 2009-150975 A | 7/2009 |

* cited by examiner

*Primary Examiner* — William C Dowling
(74) *Attorney, Agent, or Firm* — AdvantEdge Law Group, LLC

(57) ABSTRACT

A projector includes: an optical system includes a light source, a light modulation element for modulating light emitted from the light source to form an optical image, and a projection lens for projecting the optical image, the optical system is structured such that an illumination optical axis of the light source and a projection optical axis of the projection lens cross each other substantially at right angles in the plan view; and a cooling fan configured to the light modulation element, and has a rotation axis crossing each other substantially at right angles with a discharge direction where a cooling air is discharged, the cooling fan is disposed in the vicinity of the projection lens and on the side where the light source is provided such that the rotation axis extends in the thickness direction of the projector.

4 Claims, 5 Drawing Sheets

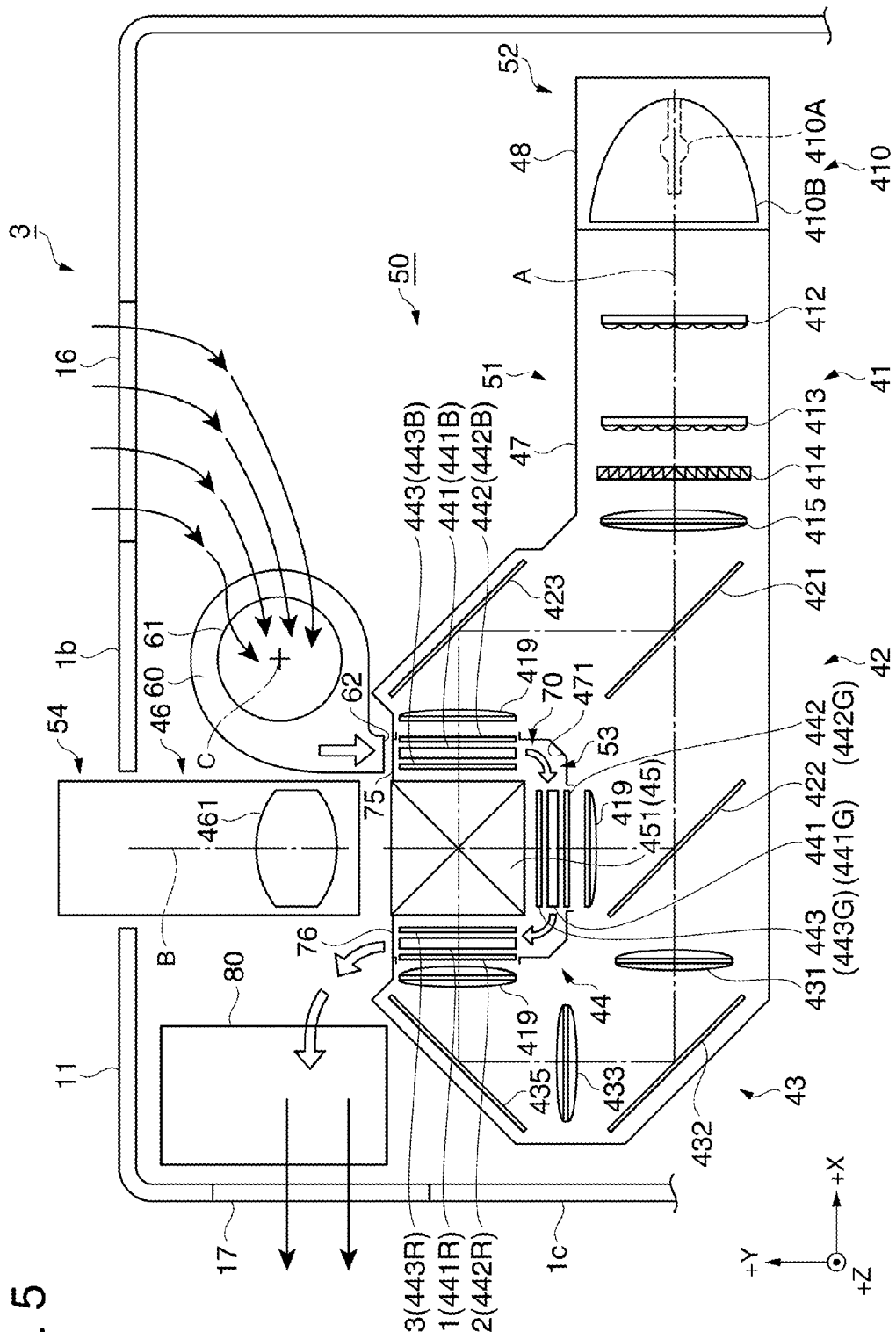

PROJECTOR

BACKGROUND

1. Technical Field

The present invention relates to a projector.

2. Related Art

A projector which has an optical system includes a light source, a light modulation element for forming an optical image by modulating light emitted from the light source, and a projection lens for projecting the optical image is known. According to this type of projector, the light modulation element and a polarization plate included in the projector and generating heat when receiving light from the light source are generally cooled using a cooling fan so as not to deteriorate the functions of the light modulation element and the polarization plate. On the other hand, the thickness of the projector has been decreasing in recent years. Under these circumstances, a structure which contains a sirocco fan on the side surface of the projection lens to sequentially cool the light modulation element has been proposed in JP-A-2001-281613 and JP-A-2009-150975.

However, the technology disclosed in JP-A-2001-281613 does not specify the positioning direction and other conditions of the sirocco fan. Moreover, the size of the fan which is preferably the largest possible size for enhancing the cooling capability depends on the thickness (height) of the housing constituting the exterior package of the projector, and thus the structure is not desirable for reduction of the thickness of the projector. According to the technology shown in JP-A-2009-150975, the thickness in the thickness direction can be reduced, but the plane size cannot be decreased in some cases.

Therefore, such a projector which has a cooling fan disposed with high efficiency to reduce the thickness and the plane size of the projector has been demanded.

SUMMARY

It is an advantage of some aspects of the invention to provide a technology capable of solving at least a part of the above problems and the invention can be implemented as the following embodiments or aspects.

A first aspect of the invention is directed to a projector which includes: an optical system includes a light source, a light modulation element for modulating light emitted from the light source to form an optical image, and a projection lens for projecting the optical image. The optical system is structured such that an illumination optical axis of the light source and a projection optical axis of the projection lens cross each other substantially at right angles in the plan view. And a cooling fan configured to the light modulation element, and has a rotation axis crossing each other substantially at right angles with a discharge direction where a cooling air is discharged. The cooling fan is disposed in the vicinity of the projection lens and on the side where the light source is provided such that the rotation axis of the cooling fan extends in the thickness direction of the projector.

According to this projector, the thickness in the height direction can be reduced by disposing the rotation axis of the cooling fan in such a direction as to extend in the thickness direction of the projector. Moreover, the optical system is structured such that the illumination optical axis of the light source and the projection optical axis of the projection lens cross each other substantially at right angles in the plan view, and the cooling fan is disposed in the vicinity of the projection lens and on the side where the light source is provided. In this case, the cooling fan is positioned with high efficiency in correspondence with the shape of the optical system. Thus, the plane size of the projector can be reduced.

In the projector of the above aspect, it is preferable that the discharge direction of the cooling fan is parallel with a plane formed by the illumination optical axis and the projection optical axis.

According to this projector, the light modulation element can be cooled by supplying cooling air to the side surface of the light modulation element. In addition, the thickness of the projector can be reduced.

In the projector of the above aspects, it is preferable that the optical system further includes a plurality of the light modulation elements, and a color combining system configured to combine the optical images formed each light modulation element. The light modulation elements are fixed to the side surfaces of the color combining system adjacent to one another, and the cooling fan cools the plural light modulation elements in the adjacent order of the light modulation elements.

According to this projector, the cooling fan cools the plural light modulation elements in the adjacent order of the light modulation elements. Thus, efficient cooling of the light modulation elements can be achieved.

In the projector of the above aspects, it is preferable that the projector further includes a housing which forms an exterior package of the projector. In this case, the housing includes an air intake port that introduces outside air into the housing and an air exhaust port that exhaust the heated air within the housing to the outside of the housing. The air intake port and the air exhaust port are provided on different surfaces of the housing.

According to this projector, the air intake port and the air exhaust port are provided on the different surfaces of the housing. Thus, the air heated and exhausted from the air exhaust port is not again introduced through the air intake port. Accordingly, efficient cooling can be achieved.

In the projector of the above aspects, it is preferable that the projector further includes a power source unit configured to supply power to the respective components included in the projector. In this case, the cooling fan configured to cool the power source unit by introducing the outside air and configured to cool the light modulation element by discharging the outside air.

According to this projector, the power source unit which generates heat is cooled by introducing the outside air using the cooling fan. In addition, the light modulation element is cooled by discharging the air using the cooling fan. Thus, efficient cooling of the power source unit and the light modulation element can be achieved by using the cooling fan.

In the projector of the above aspects, it is preferable that the projector further includes a power source unit configured to supply power to the respective components included in the projector. In this case, the cooling fan configured to cool the power source unit by using air that cooled the light modulation element.

According to this projector, the power source unit which generates heat is cooled by using air having cooled the light modulation element. Thus, efficient cooling of the power source unit and the light modulation element can be achieved by using the cooling fan.

In the projector of the above aspects, it is preferable that the air intake port is provided on a front surface of the housing.

According to this projector, the air intake port is provided on a front surface of the housing corresponding to the surface where the projection lens is disposed. Thus, the cooling fan disposed in correspondence with the position of the optical system including the projection lens can efficiently perform the operation for introducing the outside air through the air intake port. In addition, these positions of the projection lens, the cooling fan, and the air intake port contribute to reduction of the thickness and the size of the projector.

BRIEF DESCRIPTION OF THE DRAWINGS

The invention will be described with reference to the accompanying drawings, wherein like numbers reference like elements.

FIG. 5 is a plan view schematically illustrating the positions of a cooling fan and a power source unit of a projector according to a third embodiment.

DESCRIPTION OF EXEMPLARY EMBODIMENTS

Exemplary embodiments according to the invention are hereinafter described with reference to the drawings.

First Embodiment

Figure 1:
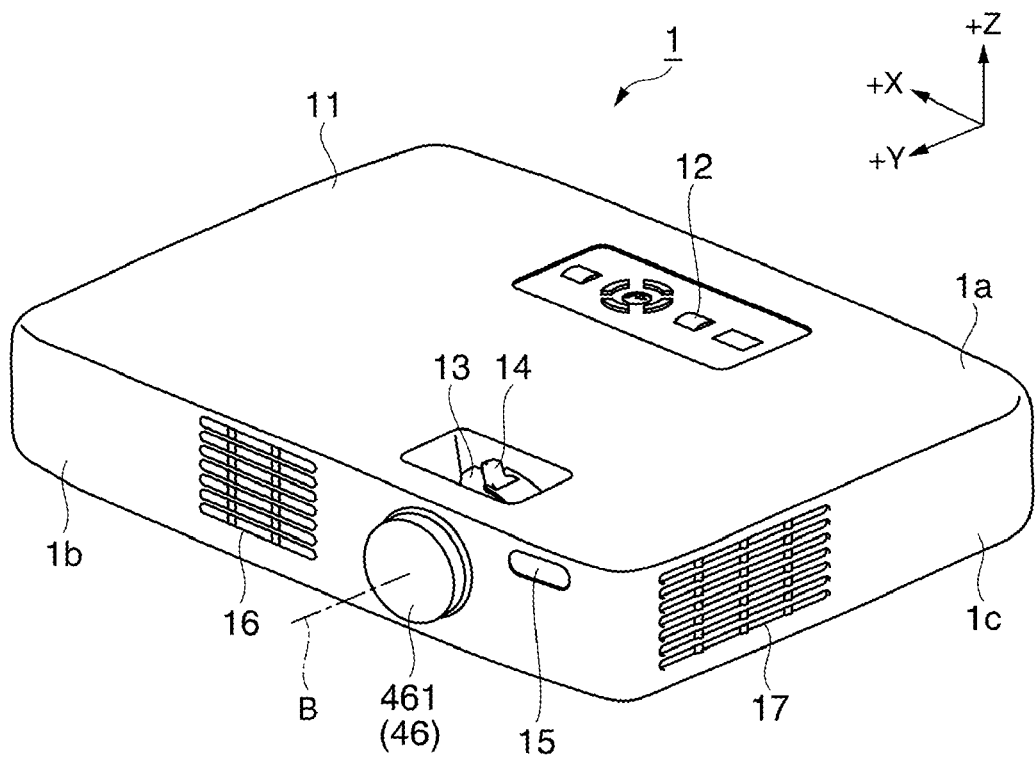
FIG. 1 is a perspective view schematically illustrating a projector according to a first embodiment.

FIG. 1 is a perspective view schematically illustrating a projector according to a first embodiment. The external appearance structure and the operation of a projector 1 are now explained with reference to FIG. 1.

In FIG. 1 and other figures for explaining this embodiment, the projector 1 is shown by using an XYZ rectangular coordinate system which has a Y axis direction corresponding to a projection optical axis B of a projection lens 461, an X axis direction corresponding to an illumination optical axis A of a light source device 410 and crossing the Y axis direction at a right angle, and a Z direction corresponding to a direction crossing the Y axis direction and the X axis direction at right angles. In this case, the direction in which light travels within the projection lens 461 is the +Y direction, the right direction with respect to the +Y direction is the +X direction, and the upward direction with respect to the +Y direction is the +Z direction. The Z axis direction agrees with the thickness direction of the projector 1.

The projector 1 forms an optical image by modulating light emitted from the light source device 410 (see FIG. 2) using light modulation elements (liquid crystal panels 441) (see FIG. 2) based on image signals, and projects the optical image through the projection lens 461 (see FIG. 2) on a screen (not shown) or the like as an image (such as a color image).

As illustrated in FIG. 1, the projector 1 is covered by a substantially rectangular parallelepiped outer housing 11. The outer housing 11 contains an optical unit 50 described later (see FIG. 2), a circuit unit (not shown) having a control unit (not shown) for operating the projector 1 and the like, and other components.

An upper surface 1a of the projector 1 has a switching unit 12 which receives operation input, a focus lever 13 which performs focus control of a projection image, a zoom lever 14 which performs size control of a projection image, and other parts. A front surface 1b of the projector 1 has the projection lens 461 projecting from the front surface 1b. The front surface 1b also has a remote controller light receiving unit 15 for receiving signals from a remote controller on the left side (−X direction side) of the projection lens 461. The front surface 1b further has an air intake port 16 through which outside air is introduced into the projector 1 (into the outer housing 11) on the right side (+X direction side) of the projection lens 461. A left surface 1c of the projector 1 has an air exhaust port 17 for exhausting heated air within the outer housing 11 to the outside of the outer housing 11.

Figure 2:
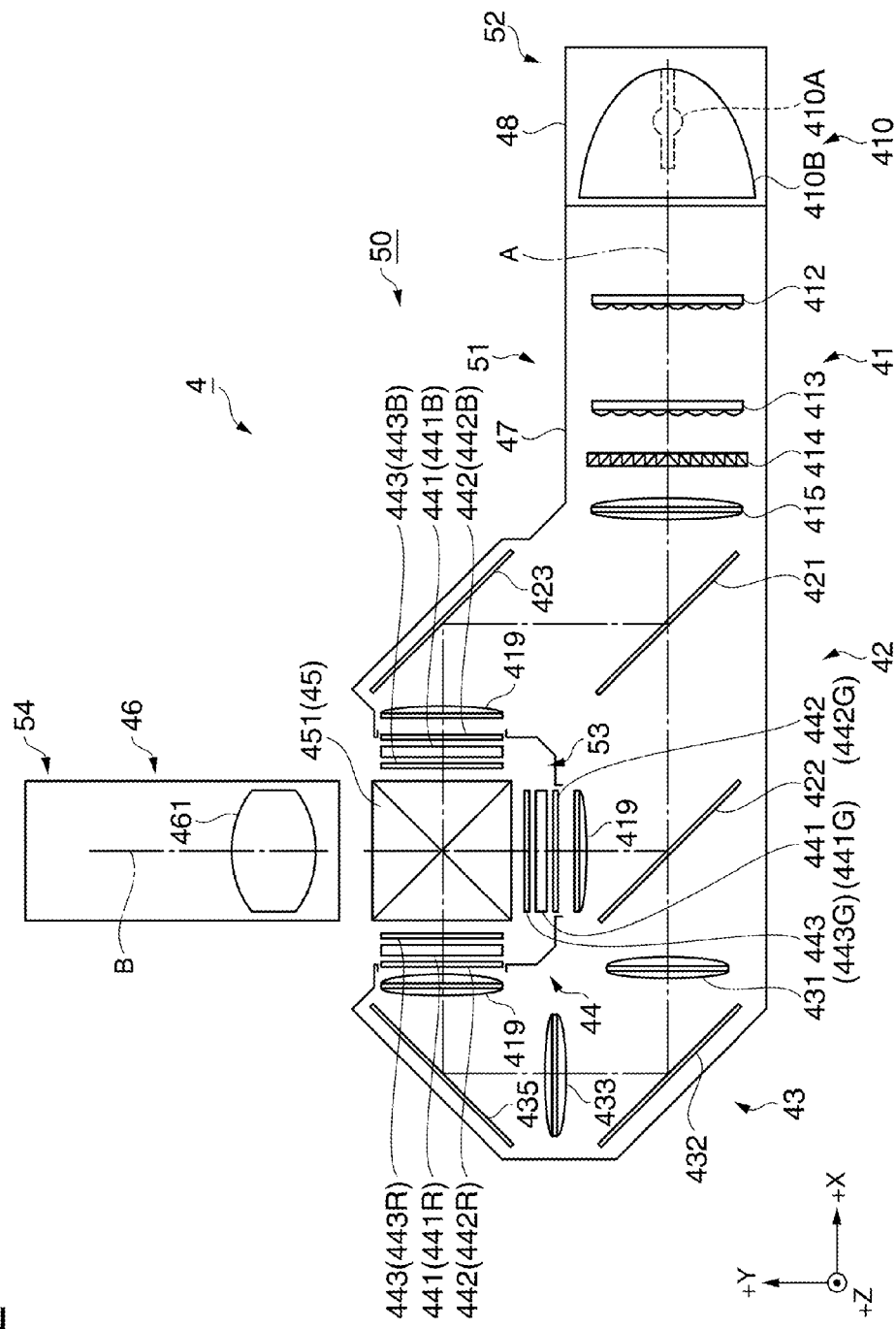
FIG. 2 is a plan view schematically illustrating an optical system and an optical unit of the projector.

FIG. 2 is a plan view schematically illustrating an optical system and the optical unit of the projector. The structure and operation of an optical system 4 included in the projector 1 are now described with reference to FIG. 2. In addition, the structure of the optical unit 50 is explained.

The optical system 4 of the projector 1 includes an integrator illumination system 41, a color separation system 42, a relay system 43, a light modulation system 44, a color combining system 45, and a projection system 46.

The integrator illumination system 41 is an optical system for converting light emitted from the light source provided as the light source device 410 into light having uniform illuminance within a plane perpendicular to the illumination optical axis A of the light source device 410. The integrator illumination system 41 has the light source device 410, a first lens array 412, a second lens array 413, a polarization converting element 414, and a stacking lens 415.

The light source device 410 has a light source lamp 410A for emitting light, and a reflector 410B. Radial light emitted from the light source lamp 410A is reflected by the reflector 410B to become substantially collimated light, and then supplied to the subsequent component. In this embodiment, the light source lamp 410A is a high pressure mercury lamp, and the reflector 410B is a parabolic mirror.

The light source lamp 410A is not limited to the high pressure mercury lamp but may be a metal halide lamp or a halogen lamp, for example. The reflector 410B is not limited to the parabolic mirror but may be an ellipsoidal mirror having a collimating concave lens on the light exit surface side of the reflector.

The first lens array 412 has small lenses disposed in matrix each of which has a substantially rectangular contour as viewed in the direction of the illumination optical axis A. The respective small lenses divide the light emitted from the light source lamp 410A into partial lights and release the divided lights in the direction of the illumination optical axis A. The second lens array 413 has structure substantially similar to that of the first lens array 412, and contains small lenses disposed in matrix. The second lens array 413 forms images of the respective small lenses of the first lens array 412 on the light modulation elements (liquid crystal panels 441) described later and included in the light modulation system 44 in cooperation with the stacking lens 415.

The polarization converting element 414 converts the lights received from the second lens array 413 into substantially one type of polarized lights to increase the use efficiency of the lights by the light modulation system 44. More specifically, the respective partial lights converted into substantially one type of polarized lights by the polarization converting element 414 are supplied to the liquid crystal panels 441 described later and included in the light modulation system 44 as lights substantially stacked on the liquid crystal panels 441 by the function of the stacking lens 415.

The color separation system 42 has two dichroic mirrors 421 and 422, and a reflection mirror 423. The plural partial lights supplied from the integrator illumination system 41 are separated into three color lights of red light (R), green light (G), and blue light (B) by the two dichroic mirrors 421 and 422.

The relay system 43 has an entrance side lens 431, a relay lens 433, and reflection mirrors 432 and 435. The relay system 43 has a function of guiding the red light as the color light separated by the color separation system 42 toward the liquid crystal panel 441 (441R) for red light described later and included in the light modulation system 44.

The dichroic mirror 421 of the color separation system 42 transmits the green light component and the red light component contained in the lights received from the integrator illumination system 41, and reflects the blue light component. The blue light reflected by the dichroic mirror 421 is reflected by the reflection mirror 423, and then passes through a field lens 419 and reaches the liquid crystal panel 441 (441B) for blue light. The field lens 419 converts the respective partial lights received from the second lens array 413 into parallel lights with respect to the center axis (chief ray) of the partial lights. The field lenses 419 provided on the light entrance sides of the liquid crystal panels 441 (441R and 441G) for red light and green light have similar functions.

The green light contained in the red light and green light transmitted by the dichroic mirror 421 is reflected by the dichroic mirror 422, and then passes through the field lens 419 and reaches the liquid crystal panel 441 (441G) for green light. On the other hand, the red light is transmitted by the dichroic mirror 422 and passes through the relay system 43. Then, the red light further passes through the field lens 419 and reaches the liquid crystal panel 441 (441R) for red light.

The relay system 43 for the red light is provided to prevent lowering of the use efficiency of the red light which has a longer optical path length than those of the other color lights and thus may cause divergence of the light and the like. That is, the relay system 43 is provided to supply the partial lights having entered the entrance side lens 431 to the field lens 419 without change. While the relay system 43 is equipped for the supply of the red light contained in the three color lights, the relay system 43 may be used to supply other color lights such as the blue light.

The light modulation system 44 modulates received lights according to image signals. The light modulation system 44 has three entrance side polarization plates 442 (red light entrance side polarization plate 442R for red light, green light entrance side polarization plate 442G for green light, and blue light entrance side polarization plate 442B for blue light) as optical elements for receiving the respective color lights separated by the color separation system 42. The light modulation system 44 also has the three liquid crystal panels 441 (red light liquid crystal panel 441R for red light, green light liquid crystal panel 441G for green light, and blue light liquid crystal panel 441B for blue light) as light modulation elements disposed subsequent to the respective entrance side polarization plates 442. The light modulation system 44 further has three exit side polarization plates 443 (red light exit side polarization plate 443R for red light, green light exit side polarization plate 443G for green light, and blue light exit side polarization plate 443B for blue light) disposed subsequent to the respective liquid crystal panels 441.

Each of the liquid crystal panels 441 (441R, 441G, and 441B) contains polysilicon TFT (thin film transistor) as switching elements, for example, and has a pair of opposed transparent substrates into which liquid crystals are sealed. The liquid crystal panels 441 modulate lights received via the entrance side polarization plates 442 based on the image signals and release the modulated lights.

The entrance side polarization plates 442 transmit only polarized lights contained in the respective color lights separated by the color separation system 42 and having a predetermined direction, and absorb the other lights. The exit side polarization plates 443 have structure similar to that of the entrance side polarization plates 442, that is, transmit only polarized lights contained in the lights received from the liquid crystal panels 441 and having a predetermined direction, and absorb the other lights. The polarization optical axis of the polarized lights transmitted by the exit side polarization plates 443 is set perpendicular to the polarization optical axis of the polarized lights transmitted by the entrance side polarization plates 442.

The color combining system 45 combines the optical images modulated for each color light and released from the exit side polarization plates 443 to form a color image. The color combining system 45 has a cross dichroic prism 451. The cross dichroic prism 451 has a dielectric multilayer film for reflecting red light and a dielectric multilayer film for reflecting blue light disposed in a substantially X shape along the interfaces of four rectangular prisms to combine the three color lights by using the dielectric multilayer films. The color light combined by the cross dichroic prism 451 is supplied to the projection system 46 as an optical image.

The projection system 46 has the projection lens 461 constituted by a plurality of lenses. The optical image (image light) supplied from the cross dichroic prism 451 is projected on the screen (not shown) as the color image after expanded by the projection lens 461. The optical axis of the projection lens 461 is indicated as the projection optical axis B in the figure.

According to the optical system 4 in this embodiment, the illumination axis A of the light source device 410 and the projection optical axis B of the projection lens 461 cross each other at right angles in the plan view.

The optical system 4 is provided as the optical unit 50. The optical unit 50 chiefly includes an optical element unit 51, a light source unit 52, a prism unit 53, and a projection unit 54. The optical element unit 51 has the optical elements from the first lens array 412 included in the integrator illumination system 41 to the entrance side polarization plates 442 included in the light modulation system 44 as components accommodated in an optical element housing 47. The light source unit 52 has the light source device 410 accommodated in a light source housing 48. The light source unit 52 is disposed at one end of the optical element unit 51 as a replaceable unit.

The prism unit 53 has the liquid crystal panels 441 and the exit side polarization plates 443 included in the light modulation system 44, and the cross dichroic prism 451 included in the color combining system 45 as one unit. More specifically, the prism unit 53 has the cross dichroic prism 451 fixed to a not-shown substrate, and the exit side polarization plates 443 and the liquid crystal panels 441 are carried on and fixed to the corresponding side surfaces of the cross dichroic prism 451 in three directions.

As described above, the three liquid crystal panels 441 (441R, 441G, and 441B) are fixed to the respective side surfaces of the cross dichroic prism 451 in three directions. In other words, the three liquid crystal panels (441R, 441G, and 441B) are disposed adjacent to one another and fixed to the respective side surfaces of the cross dichroic prism 451 in three directions. More specifically, according to this embodiment, the liquid crystal panels 441 are disposed adjacent to one another in the order of the blue light liquid crystal panel 441B, the green light liquid crystal panel 441G, and the red light liquid crystal panel 441R and fixed to the side surfaces of the cross dichroic prism 451.

The prism unit 53 is fixed to the other end of the optical element unit 51. The other end of the optical element unit 51 is notched in three directions, and the prism unit 53 is fixed to the notched portion of the optical element unit 51.

The projection unit 54 is provided on a base (not shown) for holding the projection system 46. The optical unit 50 becomes one unit by fixing the optical element unit 51 to the base of the projection unit 54 with the light source unit 52 and the prism unit 53 fixed to the optical element unit 51.

Figure 3:
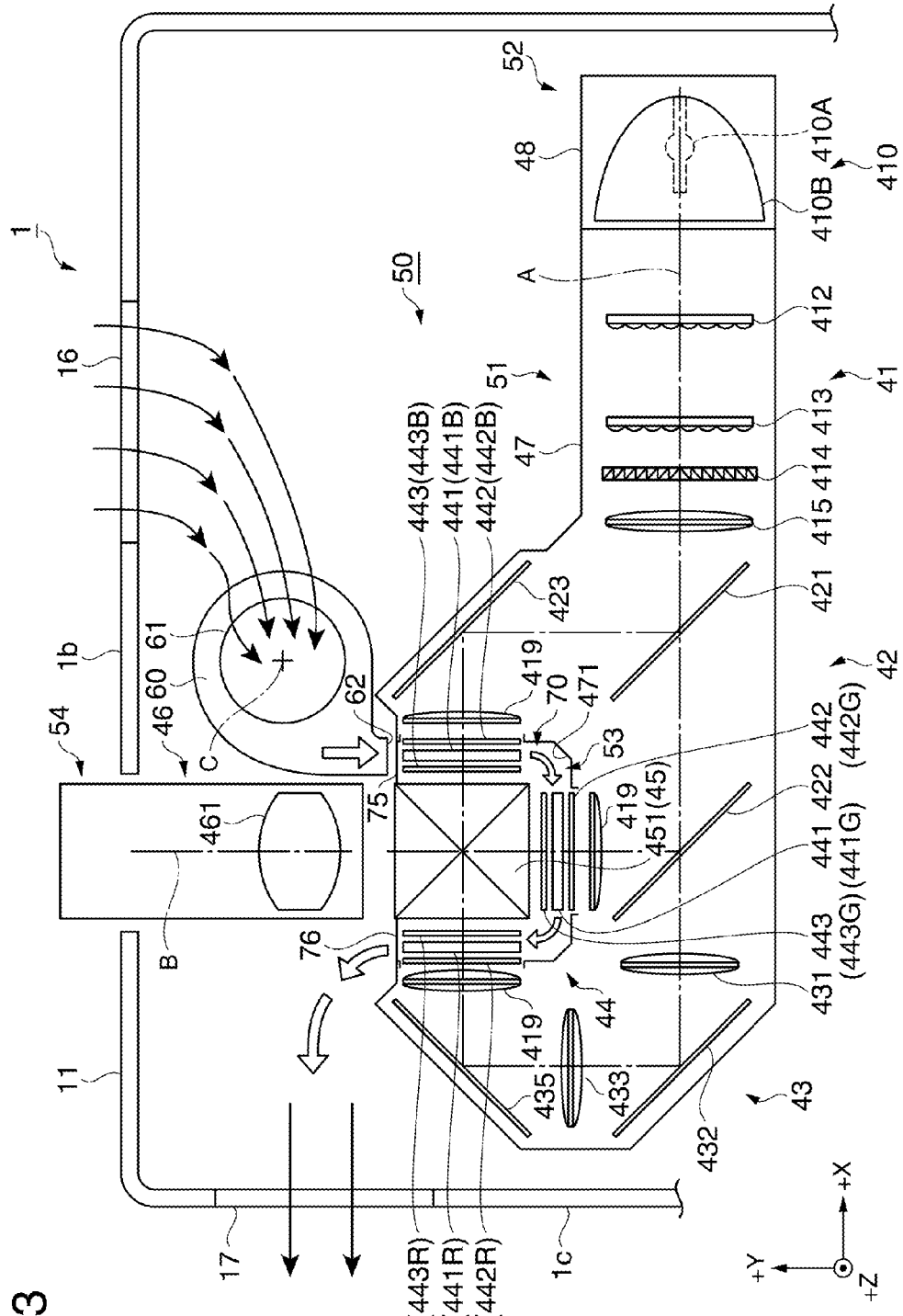
FIG. 3 is a plan view schematically illustrating the position of a cooling fan.

FIG. 3 is a plan view schematically illustrating the position of a cooling fan. The relative position and the cooling operation of a cooling fan 60 are now explained with reference to FIG. 3.

The position of the cooling fan 60 is initially discussed.

The cooling fan 60 is a so-called multiblade fan (sirocco fan) having a rotation axis C perpendicular to the discharge direction. The cooling fan 60 is disposed in the vicinity of the projection lens 461 and on the side where the light source device 410 is provided. More specifically, the cooling fan 60 is positioned in the vicinity of the side surface of the projection lens 461 on the +X side.

The cooling fan 60 is located in such a direction that the rotation axis C extends in the thickness direction of the projector 1 (Z axis direction). In addition, the cooling fan 60 is disposed in such a direction that an inlet port 61 for introducing air faces in the +Z direction and that an outlet port 62 faces the side surfaces of the exit side polarization plate 443 (443B) and the liquid crystal panel 441 (441B) of the prism unit 53. The outlet port 62 of the cooling fan 60 is opposed to an opening 75 of a space area 70 (the side surface of the blue light liquid crystal panel 441B), the details of which will be described later. This arrangement allows the cooling fan 60 to discharge the air introduced through the inlet port 61 in a direction parallel with a plane formed by the illumination optical axis A and the projection optical axis B through the outlet port 62.

The space area 70 provided in the optical unit 50 is now explained.

The space area 70 is defined by the prism unit 53 and the other end of the optical element unit 51.

The side surface of the other end of the optical element unit 51 is formed by connecting the entrance side polarization plates 442 and side walls 471 of the optical element housing 47. When the prism unit 53 is attached to the other end of the optical element unit 51, the space area 70 is produced as an area surrounded by both an end side surface constituted by the entrance side polarization plates 442 and the side walls 471 of the optical element unit 51 and the side surfaces of the cross dichroic prism 451 of the prism unit 53 in three directions.

The optical element housing 47 has extended portions (not shown) on the lower surface side (−Z direction) and the upper surface side (+Z direction) of the ends of the optical element unit 51 to close the liquid crystal panels 441 in the up-down direction. A cable (not shown) connected with the circuit unit to receive image signals is provided on the upper surfaces (+Z side surfaces) of the liquid crystal panels 441. This cable is connected with the circuit unit via notches (not shown) of the extended portions.

In this arrangement, the space area 70 is produced as a space surrounded by the cross dichroic prism 451, the entrance side polarization plates 442, and the side walls 471 in the plane direction (X-Y axis direction), and surrounded by the extended portions in the thickness direction (Z axis direction). The space area 70 is a substantially U-shaped area in the plan view. The space area 70 has clearances of lengths which do not affect the flow of the air introduced from outside and flowing within the space area 70.

The exit side polarization plates 443 and the liquid crystal panels 441 held by the cross dichroic prism 451 are disposed within the space area 70. The space area 70 has openings opened to the side surface of the blue light liquid crystal panel 441B (thickness direction on the +Y side) and to the side surface of the red light liquid crystal panel 441R (thickness direction on the +Y side). The opening opened to the side surface of the blue light liquid crystal panel 441B (thickness direction on the +Y side) is referred to as the opening 75, and the opening opened to the side surface of the red light liquid crystal panel 441R (thickness direction on the +Y side) is referred to as an opening 76.

The cooling operation of the cooling fan 60 is now explained.

At the time of the start of operation under the control of the control unit, the cooling fan 60 initiates rotation around the rotation axis C. After the rotation starts, the outside air flows into the outer housing 11 through the air intake port 16 provided on the front surface 1b of the outer housing 11. The outside air thus introduced is taken into the cooling fan 60 through the inlet port 61, and discharged through the outlet port 62 after compressed.

The outside air (air) discharged from the outlet port 62 flows into the space area 70 through the opening 75 opposed to the outlet port 62. The outside air thus introduced through the opening 75 of the space area 70 is supplied to the side surfaces (+Y side) of the blue light exit side polarization plate 443B (hereinafter referred to as exit side polarization plate 443B) and the blue light liquid crystal panel 441B (hereinafter referred to as liquid crystal panel 441B) held by the side surface of the cross dichroic prism 451 in the +X direction. Then, the outside air flows through the respective light entrance surfaces and light exit surfaces, and moves in the −Y direction.

By the flow of the air in this manner, heats generated on the exit side polarization plate 443B and the liquid crystal panel 441B are released, and thus the exit side polarization plate 443B and the liquid crystal panel 441B are cooled. At the same time, the outside air flows toward the light exit surface side (−X side) of the blue light entrance side polarization plate 442B (hereinafter referred to as entrance side polarization plate 442B) held by the side wall 471. As a result, heat generated on the entrance side polarization plate 442B is released, and thus the entrance side polarization plate 442B is cooled.

The outside air having cooled the exit side polarization plate 443B, the liquid crystal panel 441B, and the entrance side polarization plate 442B flows along the space area 70, and further travels while bended in the −X direction. Then, the outside air reaches the side surfaces (+X side) of the green light exit side polarization plate 443G (hereinafter referred to as exit side polarization plate 443G) and the green light liquid crystal panel 441G (hereinafter referred to as liquid crystal panel 441G) held by the side surface of the cross dichroic prism 451 in the −Y direction, and flows through the respective light entrance surfaces and light exit surfaces. At the same time, the outside air flows toward the light exit surface side (+Y side) of the green light entrance side polarization plate 442G (hereinafter referred to as entrance side polarization plate 442G) held by the side walls 471. By this flow, heats generated on the exit side polarization plate 443G, the liquid crystal panel 441G, and the entrance side polarization plate 442G are released, and thus the exit side polarization plate 443G, the liquid crystal panel 441G, and the entrance side polarization plate 442G are cooled.

The outside air having cooled the exit side polarization plate 443G, the liquid crystal panel 441G, and the entrance side polarization plate 442G flows along the space area 70, and further travels while bended in the +Y direction. Then, the outside air reaches the side surfaces (−Y side) of the red light exit side polarization plate 443R (hereinafter referred to as exit side polarization plate 443R) and the red light liquid crystal panel 441R (hereinafter referred to as liquid crystal panel 441R) held by the side surface of the cross dichroic prism 451 in the −X direction, and flows through the respective light entrance surfaces and light exit surfaces. At the same time, the outside air flows toward the light exit surface side (+X side) of the red light entrance side polarization plate 442R (hereinafter referred to as entrance side polarization plate 442R) held by the side wall 471. By this flow, heats generated on the exit side polarization plate 443R, the liquid crystal panel 441R, and the entrance side polarization plate 442R are released, and thus the exit side polarization plate 443R, the liquid crystal panel 441R, and the entrance side polarization plate 442R are cooled. Then, the outside air flows to the outside of the space area 70 through the opening 76.

By this method, the exit side polarization plates 443B, 443G, and 443R, the liquid crystal panels 441B, 441G, and 441R, and the entrance side polarization plates 442B, 442G, and 442R are sequentially cooled for each color. In other words, the exit side polarization plates 443B, 443G, and 443R, the liquid crystal panels 441B, 441G, and 441R, and the entrance side polarization plates 442B, 442G, and 442R are cooled in the order of the adjacent positions.

The outside air (air) heated by robbing heats from the respective optical elements while flowing within the space area 70 travels in the +Y direction to the outside of the space area 70 through the opening 76, and then is exhausted to the outside of the projector 1 via the air exhaust port 17 formed on the left surface 1c of the outer housing 11. The outside air (air) having flowed through the opening 76 to the outside of the space area 70 further flows within the projector 1 to cool the circuit unit (not shown) disposed above the optical unit 50 (+Z direction), and is exhausted through the air exhaust port 17.

According to this embodiment, the following advantages can be offered.

According to the projector 1 in this embodiment, the rotation axis C of the cooling fan 60 extends in the thickness direction (Z direction) of the projector 1. Thus, the thickness of the projector 1 having this structure in the thickness direction (height direction) becomes smaller than the thickness of the projector 1 whose rotation axis C extends in the plane direction (X-Y direction) of the projector 1, for example. Thus, the thickness of the projector 1 can be reduced.

Moreover, the optical system 4 is structured such that the illumination optical axis A of the light source device 410 and the projection optical axis B of the projection lens 461 cross each other at right angles, and that the cooling fan 60 is disposed in the vicinity of the projection lens 461 and on the light source device 410 side. In this arrangement, the cooling fan 60 can be positioned with high efficiency in correspondence with the shape of the optical system 4, and thus reduction of the plane size of the projector 1 can be achieved.

According to the projector 1 in this embodiment, the discharge direction of the cooling fan 60 extends parallel with the plane (X-Y plane) formed by the illumination optical axis A and the projection optical axis B. Thus, cooling air can be discharged toward the side surfaces of the liquid crystal panels 441 to cool the liquid crystal panels 441. In addition, this arrangement contributes to reduction of the thickness of the projector 1.

According to the projector 1 in this embodiment, the optical system 4 has the three liquid crystal panels 441 (441R, 441G, and 441B) disposed adjacent to one another, and the cooling fan 60 cools the three liquid crystal panels 441 (441R, 441G, and 441B) in the adjacent order (in the order of the blue light liquid crystal panel 441B, the green light liquid crystal panel 441G, and the red light liquid crystal panel 441R in this embodiment). Thus, the liquid crystal panels 441 can be efficiently cooled.

According to the projector 1 in this embodiment, the air intake port 16 is provided on the front surface 1b of the outer housing 11, and the air exhaust port 17 is provided on the left surface 1c of the outer housing 11. That is, the air intake port 16 and the air exhaust port 17 are disposed on the different surfaces of the outer housing 11. When the air intake port and the air exhaust port are formed on the same surface of the outer housing, the probability that the air heated and exhausted through the exhaust port is again introduced through the air intake port increases. However, by providing these ports on the different surfaces, this probability can be lowered. Accordingly, introduction of the air heated and exhausted through the air exhaust port 17 again into the air intake port 16 can be prevented, and thus efficient cooling can be achieved.

According to the projector 1 in this embodiment, the air intake port 16 is disposed on the front surface 1b of the outer housing 11 corresponding to the side where the projection lens 461 is positioned. In this case, the cooling fan 60 disposed in correspondence with the position of the optical system 4 including the projection lens 461 can efficiently perform the operation of introducing outside air through the air intake port 16. In addition, these positions of the projection lens 461, the cooling fan 60, and the air intake port 16 contribute to reduction of the thickness and size of the projector 1.

Second Embodiment

Figure 4:
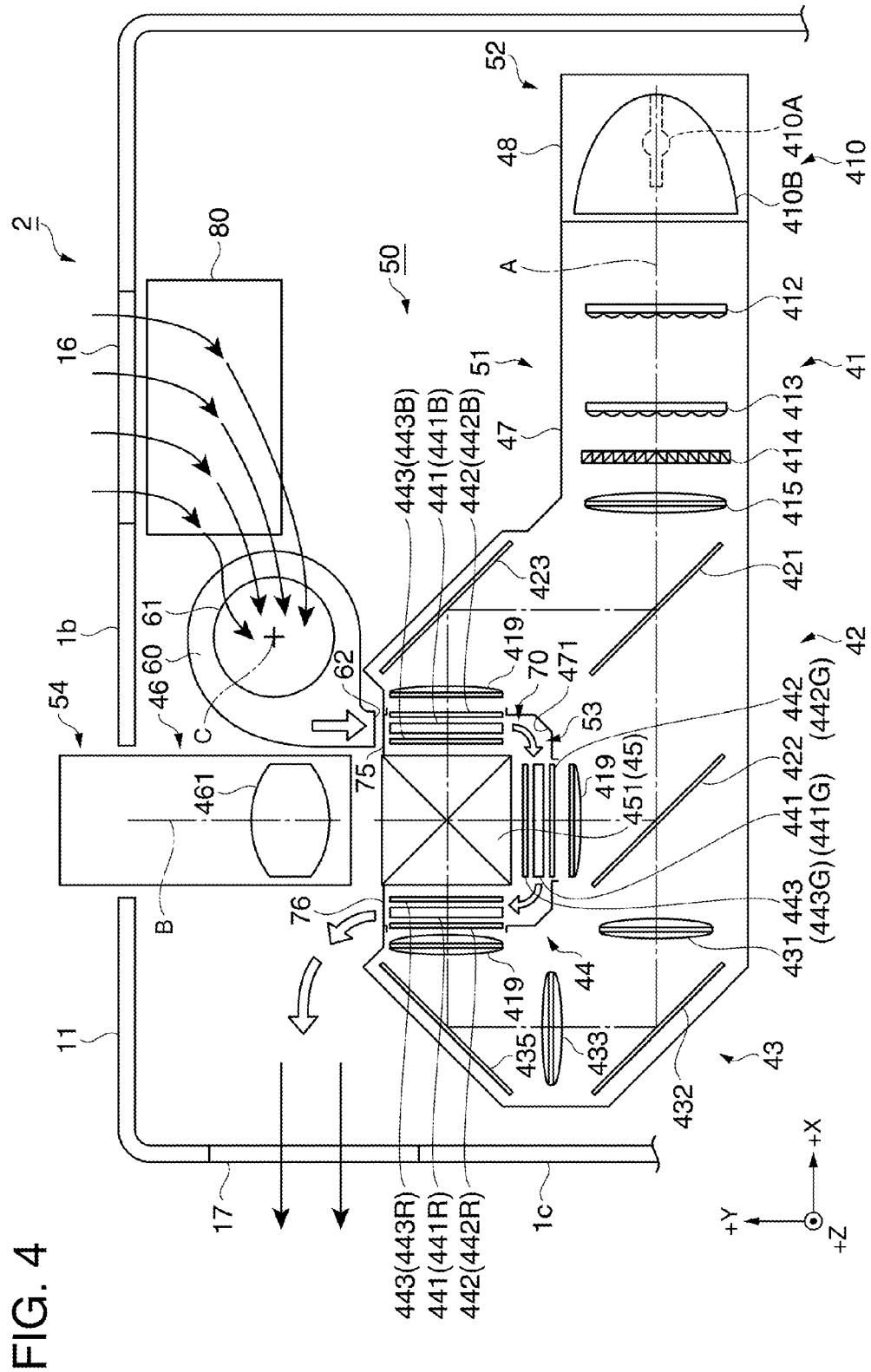
FIG. 4 is a plan view schematically illustrating the positions of a cooling fan and a power source unit of a projector according to a second embodiment.

FIG. 4 is a plan view schematically illustrating the positions of a cooling fan and a power source unit of a projector according to a second embodiment. The relative positions of the cooling fan 60 and a power source unit 80, and the cooling operation of the cooling fan 60 are now explained with reference to FIG. 4. In FIG. 4, similar reference numbers are given to elements similar to those in the first embodiment, and the same detailed explanation is not repeated.

The structures of the optical system 4 and the optical unit 50 of a projector 2 in this embodiment are similar to the corresponding structures in the first embodiment, and the position of the cooling fan 60 with respect to the optical system 4 and the optical unit 50 is also similar to the corresponding position in the first embodiment. The second embodiment is different from the first embodiment in that the power source unit 80 is provided between the air intake port 16 of the outer housing 11 and the cooling fan 60.

The power source unit 80 supplies power to the respective components constituting the projector 2. As described above, the power source unit 80 in this embodiment is disposed between the air intake port 16 of the outer housing 11 and the cooling fan 60.

When the cooling fan 60 starts rotation, outside air is introduced into the outer housing 11 through the air intake port 16 of the outer housing 11. The introduced outside air initially flows inside and the outer periphery of the power source unit 80, and then is taken into the inlet port 61 of the cooling fan 60. Then, the outside air is discharged from the outlet port 62 of the cooling fan 60 after compressed.

According to this structure, the outside air introduced into the outer housing 11 through the air intake port 16 flows through the power source unit 80 before taken into the inlet port 61 of the cooling fan 60. Thus, the outside air cools the power source unit 80 by robbing heat generated on the power source unit 80. That is, the cooling fan 60 cools the power source unit 80 by introducing the outside air. Then, the outside air is taken into the inlet port 61 of the cooling fan 60, and compressed and discharged from the outlet port 62.

The outside air discharged from the outlet port 62 of the cooling fan 60 flows within the space area 70 to cool the exit side polarization plates 443, the liquid crystal panels 441, and the entrance side polarization plates 442 similarly to the first embodiment. Then, the outside air (air) heated and discharged from the space area 70 is exhausted to the outside of the projector 2 through the air exhaust port 17 of the outer housing 11 similarly to the first embodiment.

The projector 2 in the second embodiment is different from the projector 1 in the first embodiment in that the power source unit 80 is provided between the air intake port 16 and the cooling fan 60, but is similar to the projector 1 in other points. Thus, the projector 2 offers the corresponding advantages included in the respective advantages of the projector 1 in the first embodiment, and also provides the following advantage.

According to the projector 2 in this embodiment, the power source unit 80 which also generates heat can be cooled when the cooling fan 60 introduces the outside air. In addition, the exit side polarization plates 443, the liquid crystal panels 441, and the entrance side polarization plates 442 can be cooled by the discharge of the outside air from the cooling fan 60. Accordingly, efficient cooling of the power source unit 80 and the liquid crystal panels 441 can be achieved by the cooling fan 60.

Third Embodiment

FIG. 5 is a plan view schematically illustrating the positions of a cooling fan and a power source unit in a projector according to a third embodiment. The relative positions of the cooling fan 60 and the power source unit 80, and the cooling operation of the cooling fan 60 are now explained with reference to FIG. 5. In FIG. 5, similar reference numbers are given to elements similar to those in the first and second embodiments, and the same detailed explanation is not repeated.

The structures of the optical system 4 and the optical unit 50 of a projector 3 in this embodiment are similar to the corresponding structures in the first embodiment, and the position of the cooling fan 60 with respect to the optical system 4 and the optical unit 50 is also similar to the corresponding position in the first embodiment. The third embodiment is different from the second embodiment in that the power source unit 80 is provided between the air exhaust port 17 of the outer housing 11 and the opening 76 of the space area 70.

When the cooling fan 60 starts rotation, similar to the first embodiment, outside air is introduced into the outer housing 11 through the air intake port 16 of the outer housing 11. The introduced outside air is taken into the inlet port 61 of the cooling fan 60 and discharged from the outlet port 62 of the cooling fan 60 after compressed. The outside air discharged therefrom flows in the space area 70 to cool the exit side polarization plates 443, the liquid crystal panels 441, and the entrance side polarization plates 442 similarly to the first embodiment.

Then, the outside air (air) heated and discharged from the opening 76 of the space area 70 flows through the inside and the outer periphery of the power source unit 80, and is then exhausted through the air exhaust port 17. According to this structure, the outside air discharged from the opening 76 of the space area 70 flows through the power source unit 80 before exhausted from the air exhaust port 17 to cool the power source unit 80 by robbing heat generated on the power source unit 80. That is, the cooling fan 60 cools the power source unit 80 by using the outside air (air) having cooled the exit side polarization plates 443, the liquid crystal panels 441, and the entrance side polarization plates 442.

The projector 3 in the third embodiment is different from the projector 1 in the first embodiment in that the power source unit 80 is provided between the air exhaust port 17 and the opening 76, but is similar to the projector 1 in other points. Thus, the projector 3 offers the corresponding advantages included in the respective advantages of the projector 1 in the first embodiment, and also provides the following advantage.

According to the projector 3 in this embodiment, the cooling fan 60 cools the power source unit 80 by using the outside air (air) having cooled the exit side polarization plates 443, the liquid crystal panels 441, and the entrance side polarization plates 442. Thus, the cooling fan 60 can achieve efficient cooling of the liquid crystal panels 441 and the power source unit 80.

The invention is not limited to the embodiments described above, and it is therefore intended that various changes and improvements including the following modified examples may be made without departing from the scope of the invention.

According to the first through third embodiments, the air intake port 16 is disposed on the front surface 1b of the outer housing 11, and the air exhaust port 17 is disposed on the left surface 1c of the outer housing 11. However, the air intake port and the air exhaust port may be provided on any surfaces of the outer housing 11 as long as these ports are disposed on different surfaces. For example, the air intake port may be disposed on the upper surface of the outer housing, and the air exhaust port may be disposed on the side surface. Even in this arrangement, the same advantages can be offered.

According to the first through third embodiments, the optical system 4 includes the lens integrator system having the first lens array 412 and the second lens array 413 as the optical system for equalizing the illuminance of light emitted from the light source device 410. However, the optical system 4 may include a rod integrator system having a light guide rod.

According to the optical system 4 in the first through third embodiments, the light source device 410 (the light source lamp 410A) may be constituted by various types of solid light emission element such as laser diode, LED (light emitting diode), organic EL (electro luminescence) element, and silicon light emission element.

The entire disclosure of Japanese Patent Application No. 2009-170889, filed Jul. 22, 2009 is expressly incorporated by reference herein.

What is claimed is:
1. A projector comprising:
an optical system including a light source, a plurality of light modulation elements for modulating light emitted from the light source to form an optical image, a plurality of the light modulation elements disposed adjacent to one another, and a projection lens for projecting the optical image, the optical system configured such that an illumination optical axis of the light source is substantially perpendicular to a projection optical axis of the projection lens in the plan view;

a cooling fan configured to cool a plurality of the light modulation elements in the adjacent order, the cooling fan having a rotation axis that is substantially perpendicular to a discharge direction that a cooling air is discharged, and the cooling fan disposed in the vicinity of the projection lens and on the side where the light source is provided such that the rotation axis extends in a thickness direction of the projector; and a housing configured to form an exterior package of the projector, the housing containing an air intake port that introduces outside air into the housing and an air exhaust port that exhaust heated air within the housing to the outside of the housing, wherein:

the air intake port and the air exhaust port are provided on different surfaces of the housing, and the air intake port is provided on a surface of the housing that the projection lens is positioned and on a side that the cooling fan is positioned for the projection lens.

2. The projector according to claim 1, wherein
the discharge direction of the cooling fan is parallel with a plane formed by the illumination optical axis and the projection optical axis.

3. The projector according to claim 1, further comprising:
a power source unit configured to supply power to the respective components included in the projector,
wherein the cooling fan is configured to cool the power source unit by introducing the outside air and is configured to cool the light modulation elements by discharging the outside air.

4. The projector according to claim 1, further comprising:
a power source unit configured to supply power to the respective components included in the projector,
wherein the cooling fan is configured to cool the power source unit by using air that cooled the light modulation elements.

* * * * *